United States Patent
Lay, Jr. et al.

[11] 3,867,695
[45] Feb. 18, 1975

[54] RECYCLING ELECTROMETER

[75] Inventors: Lowell B. Lay, Jr.; Andrew A. Sanders, both of Tulsa, Okla.

[73] Assignee: Avco Corporation, Tulsa, Okla.

[22] Filed: Nov. 28, 1973

[21] Appl. No.: 419,646

[52] U.S. Cl. ............... 324/123 R, 324/120, 332/14
[51] Int. Cl. ....................... G01r 1/30, G01r 19/26
[58] Field of Search........ 324/123 R, 120, 99 D, 72; 332/14; 307/261

[56] References Cited
UNITED STATES PATENTS

| | | | |
|---|---|---|---|
| 3,419,784 | 12/1968 | Winn | 324/120 |
| 3,482,116 | 12/1969 | James | 324/120 |
| 3,611,127 | 10/1971 | Vosteen | 324/72 |

Primary Examiner—Alfred E. Smith
Assistant Examiner—Ernest F. Karlsen
Attorney, Agent, or Firm—Charles M. Hogan; Eugene C. Goodale

[57] ABSTRACT

A recycling electrometer provides a digital signal from an analog signal and recycles to a zero signal condition. A comparator operational amplifier receives signals from an integrating operational amplifier incorporating a MOS FET transistor. When the output voltage of the integrating operational amplifier reaches a predetermined value, a relay-driver transistor is triggered by the comparator operational amplifier which pulls in a reed relay, discharges a capacitor connected for feedback across the integrating operational amplifier and generates a digital signal pulse.

4 Claims, 2 Drawing Figures

RECYCLING ELECTROMETER

BACKGROUND OF THE INVENTION

This invention relates generally to electrometers and more particularly to a recycling electrometer for particular utility to provide dose and dose rate information for any ionizing radiation.

Present electrometers generally are vacuum tube types which are suitable for many applications but they have some inherent disadvantages. The first of these is long-term drift. This arises because over a long period of time, the migration of ions and molecules within the tube structure, as well as the aging of the filament, can cause shifts in the tube quiescent current and, to a lesser degree, in the tube gain. Such drifts are less severe in solid state devices. On the other hand, there is no simple way to obtain a wide dynamic range via logarithmic response using a solid state device without sacrificing sensitivity to currents less than about $10^{-13}$ amps. The inherent disadvantage of the prior and present electrometer have limited the usefulness of radiation monitor equipment such as dosimeters and the like.

Accordingly, it is an object of this invention to provide a recycling electrometer which overcomes the deficiencies of the prior art electrometer.

A further object of this invention is to provide a recycling electrometer which will provide a digital output proportional to the specific amount of radiation input or low level current.

A still further object of this invention is to provide a recycling electrometer having particular usefulness for dosimeters.

SUMMARY

This invention provides an improved recycling electrometer for providing a digital output signal proportional to the input. The recycling electrometer comprises an electrometer and recycling circuit. The electrometer includes an integrating operational amplifier incorporating a MOS FET transistor, said amplifier having positive feedback across a capacitor connected thereacross. The recycling circuit comprises a comparator operational amplifier, relay driver transistor, and a coil operated magnetic reed relay. The output of the integrating operational amplifier provides one input for the comparator amplifier. The output of the comparator amplifier controls the relay driver transistor which provides the usable output digital signal. The magnetic reed relay is connected across the integrating operational amplifier and controls the recycling of the amplifier. The operation of the reed relay is controlled by a coil which is responsive to the output of the relay driving transistor.

Other objects, details, uses and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
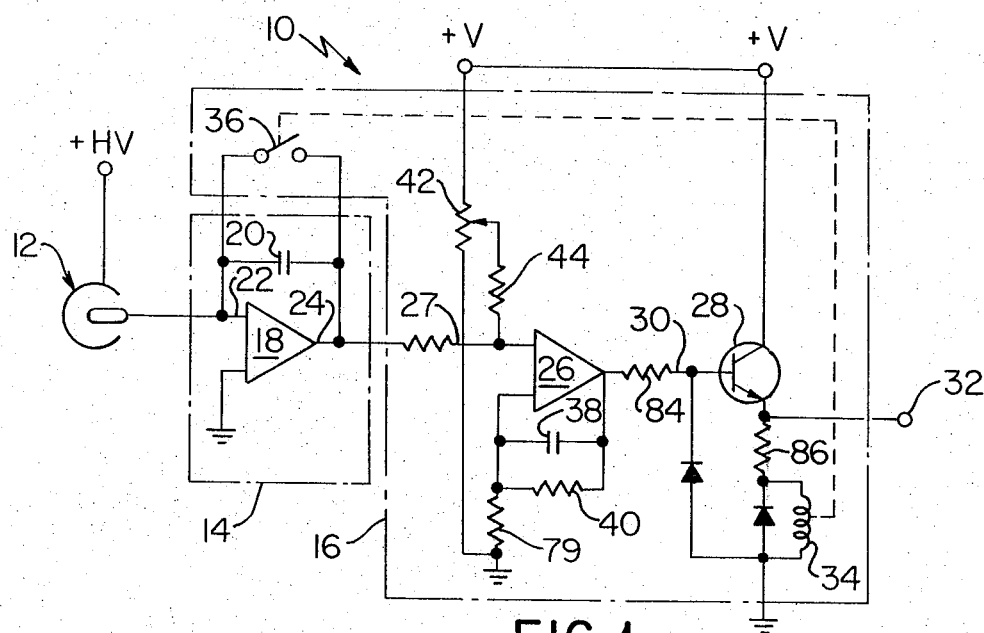
FIG. 1 is a simplified schematic of the circuitry comprising the recycling electrometer of this invention.

Reference is now made to FIG. 1 of the drawings which illustrates an exemplary embodiment of the improved recycling electrometer of this invention, which is designated generally by the reference numeral 10. For purposes of explanation only, it is seen that the recycling electrometer 10 is connected with an ion chamber 12 and as such this embodiment may be characterized generally as a dosimeter. However, it is obvious that the recycling electrometer 10 may be used with any apparatus which produces an analog low current or low charge signal.

The electrometer portion of the recycling electrometer 10 comprises that portion of the circuit within the dashed line 14 and the recycling circuit is that portion generally within the dashed line 16. The electrometer 14 comprises an integrating operational amplifier 18 which is a multistage amplifier employing integrated circuits and MOS FET transistors for high ion input impedance. An example of such an amplifier is Intersil ICH8500 sold by Intersil, Inc., of Cupertino, Calif. Capacitor 20 is connected across the amplifier 18 between the inverting input terminal 22 and output terminal 24. Thus, the capacitor 20 is connected for feedback across the operational amplifier 18. This arrangement allows one to achieve excellent temperature and drift stability. The recycling circuit 16 comprises a comparator operational amplifier 26 which is connected to the output terminal 24 by lead line 27. An example of such comparator operational amplifier is Fairchild Operational Amplifier $\mu$ A709 biased in a comparator mode. A transistor 28 is connected via lead line 30 to amplifier 26 and is responsive to the output signals therefrom. The output signal from transistor 28 may be transmitted to any utilization device, such as a digital counter or the like (not shown) via lead line and terminal 32. The output signal from transistor 28 also drives the coil relay 34. Coil 34 is operationally connected with switch 36. The coil 34 and switch 36 comprises a magnetic reed relay having an extremely high off impedance. The reed relay 34-36 is normally in the open condition. An output signal from transistor 28 will drive the reed relay 34-36 closed which in turn causes the capacitor 20 to discharge thereby resetting the operational amplifier 18 to zero. Capacitor 38 and resistor 40 provide a positive feedback for operational amplifier 26, as will be explained in more detail hereinbelow. The comparative point or point at which amplifier 26 compares signals from amplifier 18 is set by adjustment of resistors 42 and 44.

Figure 2:
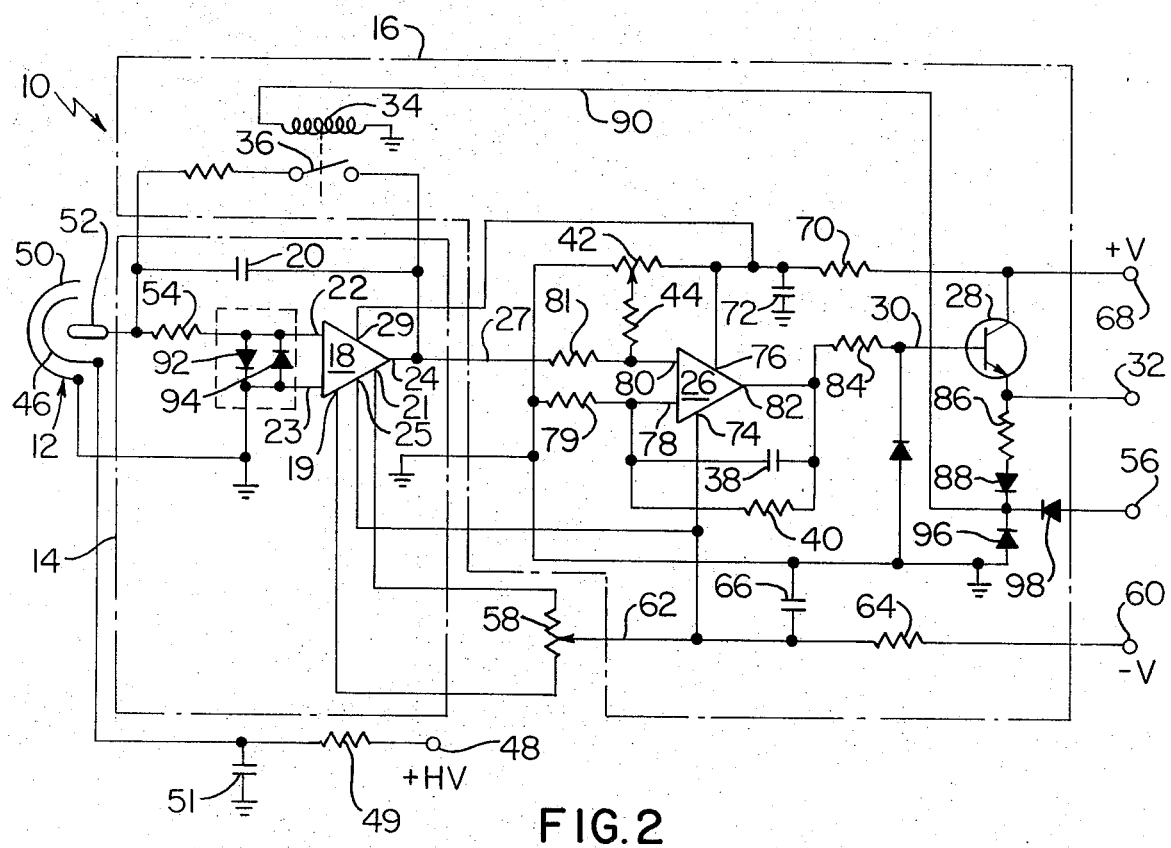
FIG. 2 is a schematic of the recycling electrometer of this invention.

For purposes of the exemplary embodiment only, it is seen that the ion chamber 12, as best seen in FIG. 2, comprises a chamber wall 46 which is connected to a source of high voltage 48. Resistor 49 and capacitor 51 comprises a filter circuit between the chamber wall 46 and high voltage source 48. The outer sensor wall 50 is such to permit ionizing radiation to pass therethrough to bombard the chamber wall 46 and is connected to ground. When the ion chamber 12 is struck with the radio active particles, ion pairs are created. Since the chamber wall 46 has a high positive voltage thereon, the positive ion is driven toward the collecting electrode 52 which generates a positive current. The positive current from electrode 52 is transmitted through resistor 54 to the inverting input terminal 22 of the operational amplifier 18.

The operational amplifier 18 is previously set at zero in an initial condition. To accomplish the zero setting, a sensor reset signal is inserted in the recycling circuit at 56. The sensor reset signal closes the reed relay 34–36 thereby discharging capacitor 20 whereby a 0 voltage is applied to input terminal 22 of operational amplifier 18. An offset null circuit includes terminals 19 and 21 which are connected through resistor 58. Resistor 58 is variably connected to a source of negative voltage 60 by lead line 62. Resistor 64 and capacitor 66 comprise a filter network for the negative power supply. By adjusting resistor 58 the offset voltage, which is the difference of voltage between input terminal 22 and noninverting input terminal 23, is compensated for so that the output voltage at terminal 24 is zero. Terminals 25 and 29 are respectively connected with the negative power supply 60 and a positive power supply 68. Resistor 70 and capacitor 72 comprise a filter network for the positive power supply 68.

When the operational amplifier 18 is set to the initial condition, the sensor reset signal 56 is stopped thereby letting the reed relay 34–36 open thereby permitting the low current signal from electrode 52 to be applied to the input terminal 22 and capacitor 20. The signal at 22 is inverted and integrated into the operational amplifier 18 wherein the output signal at terminal 24 is driven negative.

The comparator operational amplifier 26 is connected to the negative power supply 68 respectively through terminals 74 and 76. Inverting input terminal 80 is connected to the output terminal 24 of integrating operational amplifier 18 through line 27. A current limiting resistor 81 is inserted in lead line 27.

The noninverting terminal 78 is biased at or near ground potential by resistors 79 and 40. When the output of operational amplifier 18 is at 0 voltage, the inverting input terminal 80 is biased positive with respect to terminal 78 by resistors 81, 44 and 42. Resistors 41 is adjustable which permits setting the level at which the operational amplifier 26 triggers. Under the condition where terminal 80 is biased positive with respect to terminal 78, the output from operational amplifier 26 is maximum negative which biases the transistor 28 to the off condition. With the transistor 28 in this condition, relay 34–36 is open. When the output of operational amplifier 18 goes negative due to a positive input current, the bias on input terminal 80 of operational amplifier 26 goes negative. At a predetermined level, such level being determined by the setting of resistor 42, inverting input terminal 80 will be at the same or slightly more negative potential as noninverting input 78. Under this condition, the output of operational amplifier 26 goes to maximum positive voltage which turns on transistor 28. With transistor 28 in the on condition, relay 34–36 is closed which returns the output of operational amplifier 18 to zero voltage and discharges capacitor 20. Resistors 40 and 79 provide a small amount of positive feedback to operational amplifier 26 to insure positive switching.

In operation, a negative going signal is transmitted from the output terminal 24 of integrating operational amplifier 18 through lead line 27, resistor 81 to the inverting input terminal 80 of the comparator operational amplifier 26. As soon as the signal at terminal 80 reaches or becomes a little more negative than the signal at terminal 78, the output at terminal 82 starts positive. As soon as the output signal from terminal 82 starts positive, positive feedback to input terminal 78 occurs through the feedback circuit including capacitor 38 and resistor 40. With the positive feedback, the output signal of operational amplifier 26 is driven into positive saturation.

The output terminal 82 of operational amplifier 26 is connected through current limiting resistor 84 to the relay driver transistor 28. The transistor 28 is turned on only after the output of operational amplifier 26 has gone into positive saturation. As transistor 28 is turned on an output signal is provided at 32 to any utilization device. At the same time, the signal from transistor 28 is transmitted through resistor 86 and locking diode 88 to lead line 90 to energize coil 34 thereby closing the switch 36. When switch 36 is closed, capacitor 20 is discharged which immediately starts the output signal from operational amplifier 18 going positive back to zero. Thus, a positive going signal is transmitted from output terminal 24 to the inverting input terminal 80 of operational amplifier 26. When the signal at the input terminal 80 becomes more positive than the signal at the other input terminal 78, the output signal of operational amplifier 26 starts going negative out of the positive saturation condition. As the output signal from the terminal 82 starts going negative, this signal is fedback to the noninverting input terminal 78 through capacitor 38 and resistor 40 thereby driving the amplifier 26 very quickly to zero or to its previously set point. Capacitor 38 provides an AC coupling for the positive feedback so as to provide a snap-on and snap-off condition for the operational amplifier 26. As the output signal from terminal 82 goes from positive saturation toward zero, the relay driver transistor 28 is turned off which deenergizes coil 34 thereby permitting switch 36 to open. Thus, a new cycle is started with positive current again being transmitted to input terminal 22 such that the output of operational amplifier 18 will start going negative. The speed of each cycle is determined by how much current is being received by the integrating operational amplifier 18 from the ion chamber 12.

Diodes 92 and 94 protect integrating operational amplifier by preventing high voltage spikes from damaging the MOS FET transistor therein. Similarly, diodes 96 and 98 block signals in the respective lines associated therewith.

The operation of the recycle electrometer 10 is initiated by imparting a manual sensor reset signal at 56 so as to energize coil 34 which closes the switch 36 thereby discharging capacitor 20. After the coil 34 is deenergized and the switch 36 opened the current generated by the ion chamber 12 is integrated across capacitor 20 which is connected for feedback across the operational amplifier 18. This circuitry provides excellent temperature and drift stability. When the output voltage signal of operational amplifier 18 reaches a predetermined value as determined by the comparator operational amplifier 26, the relay driver transistor 28 is turned on by the output signal from operational amplifier 26. The positive feedback circuit drives the output signal quickly into positive saturation thereby turning on the relay driver transistor 28. Turning on of the transistor 28 resets the magnetic reed relay 34–36, thereby discharging capacitor, and generating a usable output signal. The recycling electrometer circuit can be tuned so that the output signal pulse corresponds to a selected amount of radiation dose.

While a present exemplary embodiment of this invention has been illustrated and described, it will be recognized that this invention may be otherwise variously embodied and practiced by those skilled in the art.

What is claimed is:

1. A recycling electrometer for providing a usable output signal pulse in response to the generation of a predetermined amount of input signal such that when said predetermined amount of input signal is exceeded the electrometer is recycled to an initial condition comprising in combination:

a signal generator for generating said signal in response to a measured condition;

an integrating operational amplifier having high input impedance, said operational amplifier having an input circuit and an output circuit, said signal being applied to said input circuit, said integrator having an initial zero condition and providing an output signal having a level proportional to the summation of the applied input signal;

a feedback circuit operationally connected between said integrating operational amplifier input and output circuits, said feedback circuit including a first capacitor connected across said integrating operational amplifier input and output circuits;

a comparator operational amplifier biased in a comparator mode and having an input circuit, the output signal from said integrating operational amplifier being applied to said input of said comparator operational amplifier, said comparator operational amplifier providing a comparator output signal when the said integrating operational amplifier output signal exceeds a predetermined level;

feedback circuitry operationally connected with said comparator operational amplifier to insure positive switching of said comparator operational amplifier;

a second capacitor connected in said comparator feedback circuit to provide an AC coupling for positive feedback thereby providing a snap-on and snap-off condition for said comparator operational amplifier;

means responsive to said comparator output signal to generate the usable output signal pulse; and a coil operated magnetic reed relay operationally connected across the first capacitor, said reed relay being normally in the open condition, said coil being responsive to the usable output signal pulse such that when said coil is engaged the reed relay is closed thereby discharging said first capacitor thereby resetting said integrator to the initial zero condition.

2. The recycling electrometer as set forth in claim 1 further comprising an offset null circuit operationally connected with said integrating operational amplifier, said null circuit being adjustable to provide zero output voltage from said integrating operational amplifier in the initial zero condition.

3. The recycling electrometer as set forth in claim 1 in which said responsive means is a driver transistor operationally connected with said comparator operational amplifier, said transistor generating the usable output signal pulse in response to the comparator output signal wherein the generation of the usable output signal pulse activates said coil to reset said integrating operational amplifier to the initial condition such that the integrating operational amplifier output signal becomes less than the comparator operational amplifier predetermined level whereby the comparator output signal is switched off thereby returning said transistor to the nonconducting state and disengaging said coil such that said integrating operational amplifier will again provide an output signal having a level proportional to the summation of the implied input signal.

4. The recycling electrometer as set forth in claim 3 further comprising adjustable means operationally connected with said comparator to permit setting of the comparator predetermined level at which level said comparator is switched on to provide the comparator output signal.

* * * * *